Figure 1:
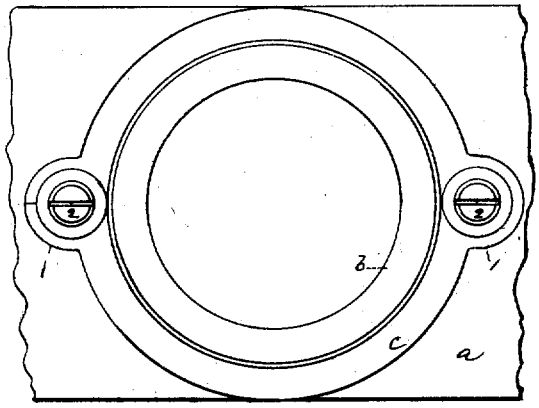

J. H. SAWYER

Assignor to G. DRAPER & SON.

FASTENINGS FOR SPINNING-RINGS.

No. 7,334 Reissued Oct. 3, 1876.

Witnesses.
C. H. Latimer.
W. J. Pratt.

Inventor.
Jacob H. Sawyer,
per Crosby & Gregory Attys.

N. PETERS, PHOTO-LITHOGRAPHER, WASHINGTON, D. C.

UNITED STATES PATENT OFFICE.

JACOB H. SAWYER, OF LOWELL, MASSACHUSETTS, ASSIGNOR TO GEORGE DRAPER & SON.

IMPROVEMENT IN FASTENINGS FOR SPINNING-RINGS.

Specification forming part of Letters Patent No. 117,934, dated August 8, 1871; reissue No. 7,334, dated October 3, 1876; application filed July 7, 1876.

*To all whom it may concern:*

Be it known that I, JACOB H. SAWYER, of Lowell, in the county of Middlesex and State of Massachusetts, have made a new and useful invention for Holding and Adjusting Spinning-Rings, of which the following specification, in connection with the drawing, is a full description.

Figure 3:
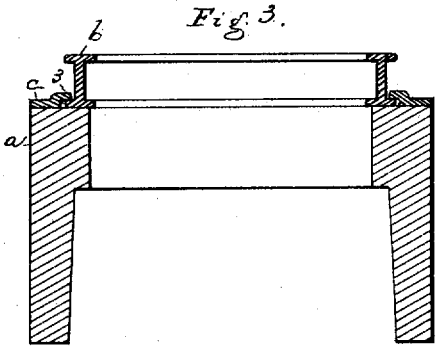
Figure 2:
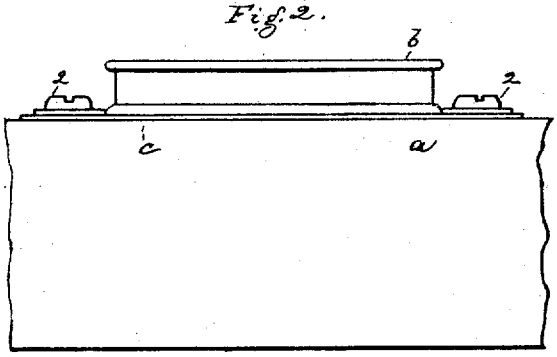
Figure 4:
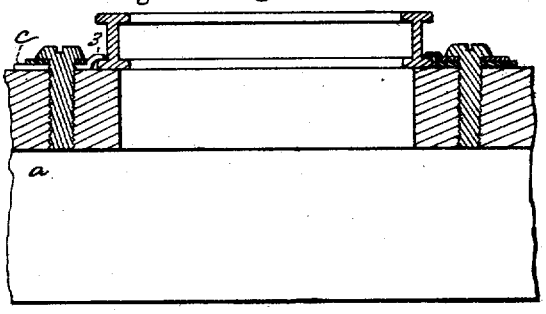
Figure 5:
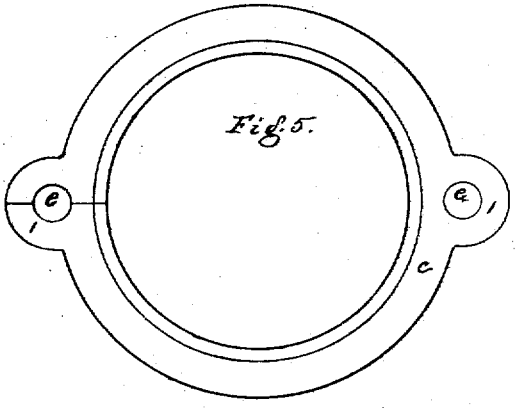
Figure 6:
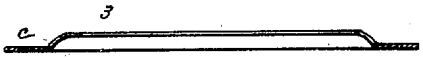

Figure 1 represents a holder and ring applied to the surface of a ring-rail; Fig. 2, a side view; Figs. 3 and 4, transverse and longitudinal sections taken through the ring, holder, and rail; Fig. 5, an under-side view of the holder removed, and Fig. 6 a section thereof.

The ring-rail *a*, provided with spindle-openings, has a ring, *b*, and holder, *c*, secured to its upper surface, and made adjustable thereon, to provide for placing the ring concentric with the usual spindle. The ring, as shown in the drawing, has two parallel races, one of which (the one not in use and next the surface of the ring-rail) serves the purpose of a flange or base, against which the holder acts, in order to press and hold the ring firmly on the rail and in adjusted position.

The holder is composed of a sheet-metal annulus, provided with ears 1. The under surface of the holder rests on the surface of the ring-rail, and is held in adjusted position by means of screws 2 2. The upper interior circular edge 3 of the holder is of the proper diameter to encompass the ring above its lower or enlarged flange or end, and is of less diameter at that point than at the lower end of the socket next the ring-rail. The lower enlarged end of the ring is received within this socket, and the ring is held down in proper position with relation to the ring-rail. To lift or remove the ring from the holder it is necessary to unscrew the screws that attach the holder to the rail.

The holder is shown as split through one of its ears, (see Figs. 1 and 5,) to facilitate the placing of the ring within the holders. The holder, surrounding the ring above the enlargement of its lower end next the rail, acts to hold the ring down firmly without the necessity of screws to confine the ring in the holder.

The space at the center of the holder is substantially a conical space, decreasing in size or diameter from the flat lower side of the holder to its upper interior edge, the change in size and the shape of the socket or interior of the holder being adapted to the shape of the ring next the ring-rail. The holes *e* through the holder are of larger diameter than the shanks of the screws 2.

It will be noticed that the ring shown has not a neck to project into the spindle-opening, and it is to such class of rings that this holder is specially applicable.

The holder is shown as adapted to encompass the lower race, lapping on, and extending entirely about, the race; but it may be provided with separate flanges to embrace the lower end of the ring on its opposite sides, and hold it down on the rail.

The holder being of thin sheet metal enables the ring to be reduced in depth, thereby permitting the race to be brought nearer the surface of the ring-rail and yet leave sufficient space between the top of the holder and the under side of the race-flange for the movement of the traveler. This reduction of the height of the ring enables the yarn-load to be wound on the bobbin or spindle nearer the upper support of the spindle, this being a matter of great importance in connection with spindles revolving at great velocity. This change in depth of the ring brings the race nearer the surface of the ring-rail, enables the yarn to be wound nearer the lower end of the bobbin, the ring-rail traversing as usual, or the length of the traverse of the rail may be increased, enabling more yarn to be wound on the bobbin.

I claim—

1. The combination, with a spinning-ring, provided with a flange or enlarged portion at its lower end, of a socketed holder, adapted to encompass the ring above its lower or enlarged flange or end, to hold the ring down in proper position with relation to the rail, and permit the adjustment of the ring and holder above the ring-rail.

2. The combination, with a ring, of a sheet-metal holder, to receive and hold the lower end of the ring, substantially as described.

3. The sheet-metal holder, provided with a socket to receive the lower end of the ring next the rail and split, substantially as described.

4. A ring-holder, provided with a ring-receiving socket or opening, of less diameter at its upper portion than at its lower portion next the ring-rail, and adapted to rest upon and hold a ring on or above the top of the ring-rail.

JACOB H. SAWYER.

Witnesses:
DANIEL E. STIMPSON,
BENJ. W. RUSHWORTH.